United States Patent [19]
Nickly

[11] 3,796,437
[45] Mar. 12, 1974

[54] BOLTING ASSEMBLY
[75] Inventor: Jean Nickly, Lyon, France
[73] Assignee: Automobiles M. Berliet, Lyon, France
[22] Filed: Mar. 9, 1972
[21] Appl. No.: 233,159

[52] U.S. Cl............... 277/166, 277/190, 277/199, 85/51
[51] Int. Cl..................... F16j 9/06, B65d 53/00
[58] Field of Search........ 277/166, 190, 199; 85/51, 85/50 AT, 1 JP

[56] References Cited
UNITED STATES PATENTS
1,735,466  11/1929  May.............................. 277/199 X
3,340,774  9/1967  Brenneke....................... 277/190 X Primary Examiner—Samuel B. Rothberg
Attorney, Agent, or Firm—Weiner, Basile and Weintraub

[57] ABSTRACT

A bolting assembly adapted to bear tightly against two adjacent components irrespective of a difference in level therebetween and includes a washer, having a substantially V-shaped recess extending across its face and remote from the head of a bolt. Two wedge-shaped packing pieces are positioned between the washer and the two components. The packing pieces each have an inclined face to bear against associated inclined faces of the washer.

4 Claims, 4 Drawing Figures

PATENTED MAR 12 1974
3,796,437
SHEET 1 OF 2
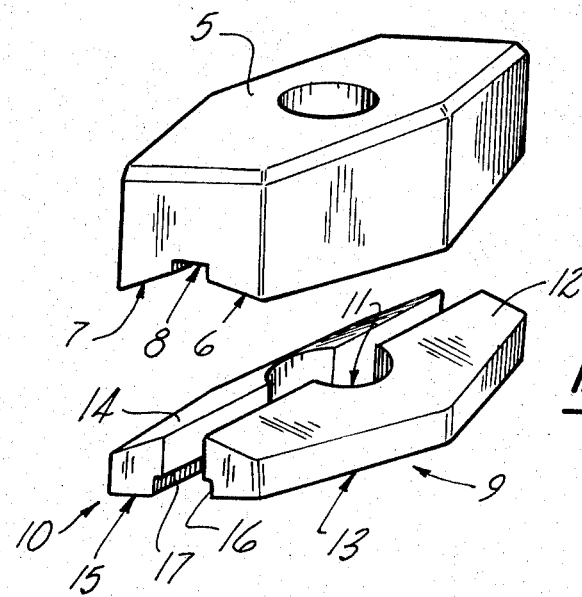
Fig-1
Fig-2
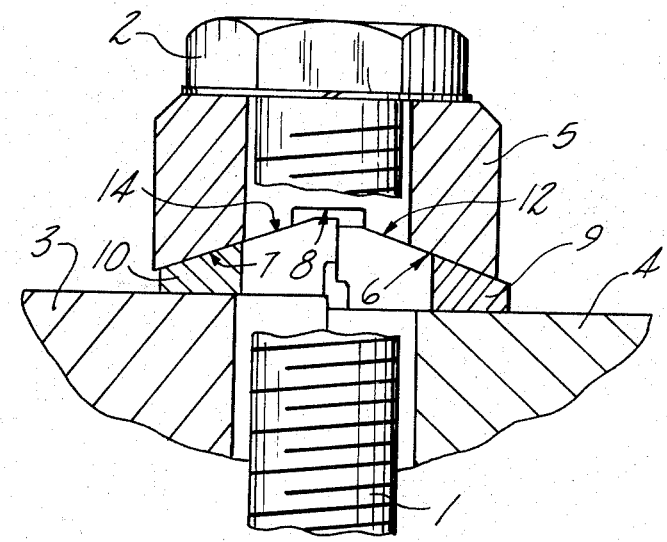
Fig-3

BOLTING ASSEMBLY

The present invention concerns an assembly for enabling a bolt to bear tightly against two adjacent components irrespective of a difference in level in the components.

On diesel engines having more than one cylinder it is known to use unit cylinder heads placed next to one another. Bolts are used to fix the heads on the engine block, and a plurality of bolts are arranged astride two adjacent cylinder heads. This arrangement in particular allows a reduction in the overall total length of the engine.

However, in order that the bolts can be tightened equally against the two adjacent cylinder heads, it is necessary that the cylinder heads be at the same level when bolted down. This can involve expensive machining on account of the accuracy required. In fact, it is observed that in spite of all precautions, the bolting down is never exactly shared in a satisfactory way, for example if one gasket is compressed more than another.

The aim of the present invention is to provide an assembly which allows a common bolt to ensure a correct fixing of two adjacent components, such as cylinder heads, even if the two components are not at exactly the same level.

According to the present invention, an assembly for enabling a bolt to bear tightly against two adjacent components irrespective of a difference in level in the components. The assembly comprises a washer, for fitting beneath the head of the bolt, having a substantially V-shaped recess extending across its face and which is arranged to be positioned remote from the head of the bolt the assembly also includes two wedge-shaped packing pieces for positioning between the washer and the two components, each packing piece having an inclined face to bear against one of the inclined faces of the V-shaped recess and a face to bear against one only of the two components.

As a result, the wedge-shaped packing pieces can slide in the V-shaped recess and one of the packing pieces can rise or fall in relation to the other so that the locking effect of the washer is transmitted equally to the two components even if they are at different levels.

The invention will be described further by way of example with reference to the accompanying drawings, in which:

FIG. 1 is a perspective view of a washer forming a part of the assembly;

FIG. 2 shows the two wedge-shaped packing pieces;

FIG. 3 is a section along the axis of the assembly after fitting between two cylinder heads.

Figure 4:
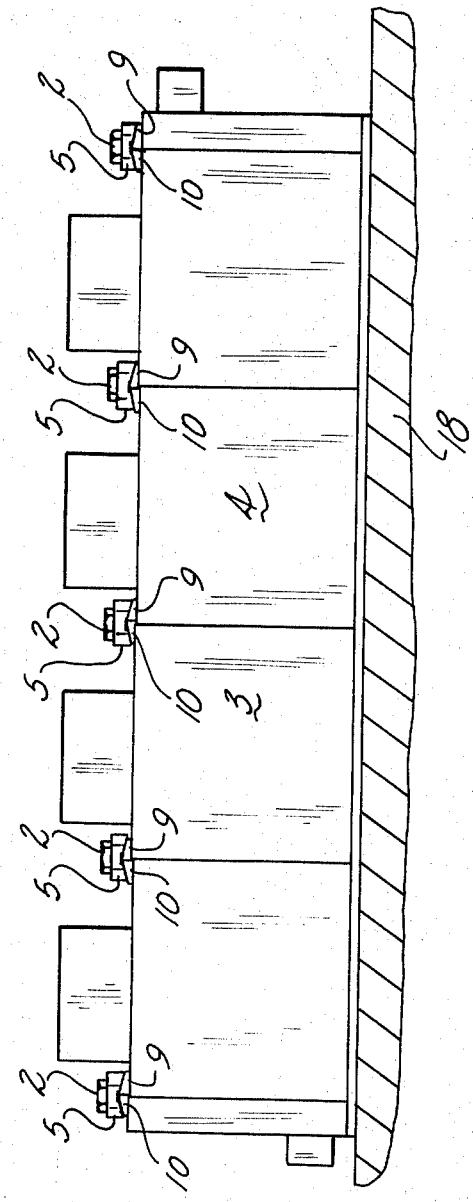
FIG. 4 is an elevation of four unit cylinder heads placed side by side and secured by the assemblies.

The assembly illustrated in FIGS. 1 to 4 is intended to be used with a bolt having a threaded stem 1 and a head 2. The bolt is mounted between two unit cylinder heads 3 and 4 to ensure their fixing on a cylinder block 18 of an internal combustion engine, and particularly on a diesel engine.

A washer 5 is placed under the head 2 of the bolt. The lower surface of the washer is substantially V-shaped, with the sides of the V being formed by the inclined faces 6 and 7 arranged to positioned remote from the head. A groove 8 is cut at the apex of of the stem 1 of the bolt.

The assembly includes two wedge-shaped packing pieces 9 and 10 for positioning between the washer 5 and cylinder heads 3 and 4. The packing piece 9 has a semicircular recess 11 dimensioned to fit round the stem 1 of the bolt leaving some play. The upper face 12 of the packing piece 9 is inclined at an angle to the plane of the lower face 13. The thickness of the packing piece 9 decreases from the side face containing the recess 11 to the opposite side face.

The wedge-shaped packing piece 10 is similar to the packing piece 9 and has an upper face 14 inclined at an angle to its lower face 15.

Finally, a groove 16 or 17 is formed along the lower internal edge of each packing piece 9 and 10, respectively.

In operation when the packing piece 9 has been placed on the cylinder head 4, and the packing piece 10 has been placed on the cylinder head 3, they both are capped by the washer 5 on which the head 2 of the bolt bears. The inclined faces 12 and 14 of the packing pieces 9 and 10 rest on the faces 6 and 7 of the V-shaped lower surface of the washer 5. Upon tightening of the bolt the two packing pieces 9 and 10 can slide along the faces of the V-shaped lower surface of the washer 5, until they abut one against the other as shown in FIG. 3. In this particular case, it has been supposed that the cylinder head 3 is higher than the cylinder head 4. The left packing piece 10 slides and rises along the V-shaped lower surface and brings about a fall in the right packing piece 9 along the face 6 under the influence of the thrust which is communicated to it.

Finally, when the fixing bolt 2 is tightened, a counterbalancing effect is produced which allows the equal division of the screwing down between the two cylinder heads.

I claim:

1. An assembly for enabling a bolt to bear tightly against two adjacent components irrespective of a difference in levels of the components comprising: a washer for fitting beneath the head of the bolt with a face of the washer which is arranged to be positioned remote from the head having a substantially V-shaped recess therein, and teo wedged-shaped packing pieces for positioning between the washer and the two components, an inclined face on each packing piece engageable against one of the inclined faces of the V-shaped recess and a further face on each packing piece engageable with one only of the two components.

2. An assembly as claimed in claim 1, in which a groove is cut in the washer at the apex of the substantially V-shaped recess.

3. An assembly according to claim 1 in which a groove is cut along a lower internal edge of each wedge-shaped packing piece.

4. An assembly according to claim 1 when fitted on a bolt whose head is astride two adjacent unit cylinder heads of a diesel engine.

* * * * *

UNITED STATES PATENT OFFICE
CERTIFICATE OF CORRECTION

Patent No. 3,796,437  Dated March 12, 1974

Inventor(s) Jean Nickly

It is certified that error appears in the above-identified patent and that said Letters Patent are hereby corrected as shown below:

On the title sheet, left column, after
"[21] Appl. No.: 233,159" insert
--[30] Foreign Application Priority Data
   March 25, 1971  France...........71 11 429--.

Signed and sealed this 10th day of September 1974.

(SEAL)
Attest:

McCOY M. GIBSON, JR.           C. MARSHALL DANN
Attesting Officer              Commissioner of Patents